No. 876,931. PATENTED JAN. 21, 1908.
A. G. BLAZIER.
CLAMP.
APPLICATION FILED APR. 3, 1907.
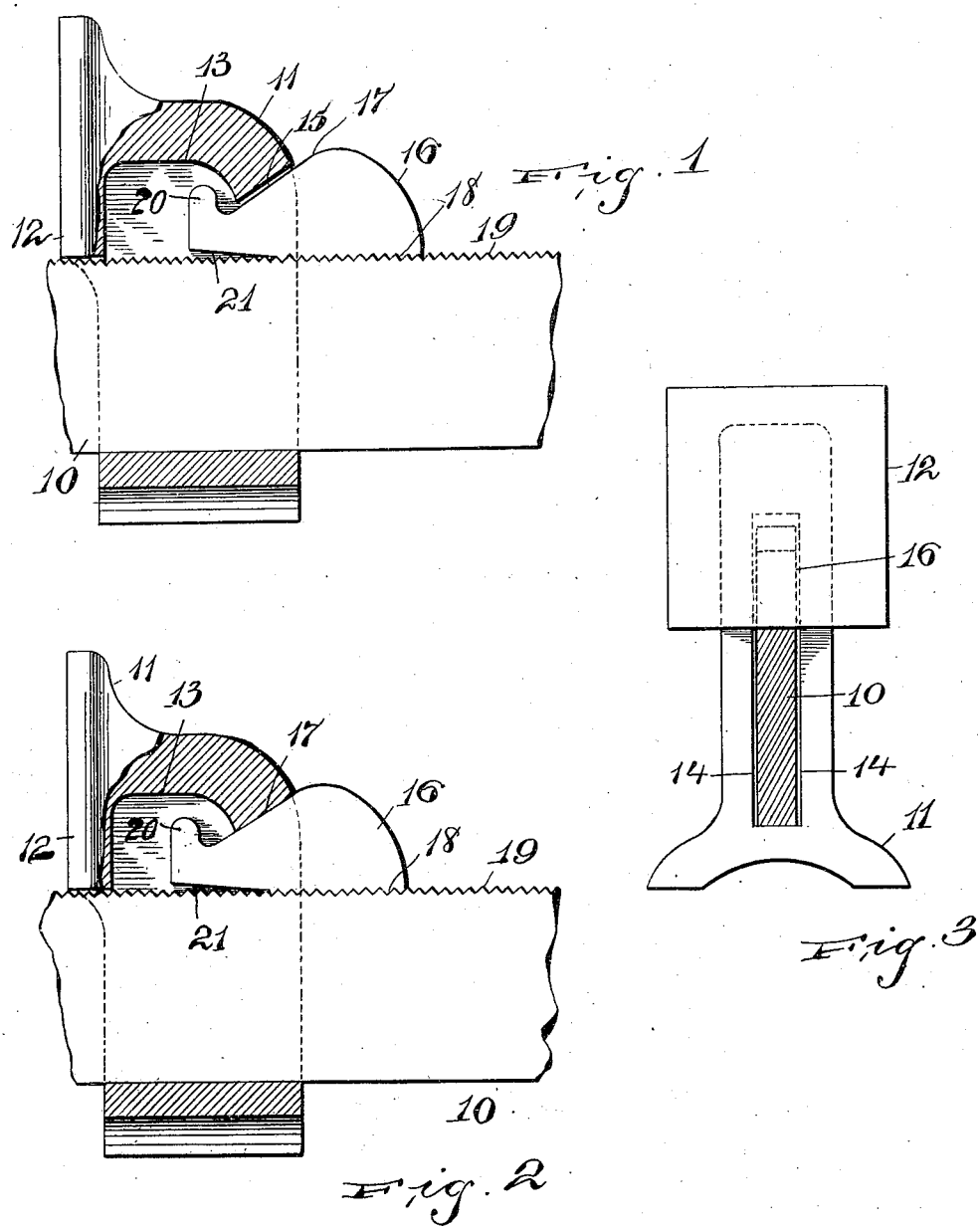
WITNESSES:
S. A. Rogers
E. A. Pell
INVENTOR
Alfred G. Blazier,
BY
Wm. H. Caufield.
ATTORNEY

UNITED STATES PATENT OFFICE.

ALFRED G. BLAZIER, OF NEWARK, NEW JERSEY.

CLAMP.

No. 876,931. Specification of Letters Patent. Patented Jan. 21, 1908.

Application filed April 3, 1907. Serial No. 366,088.

*To all whom it may concern:*

Be it known that I, ALFRED G. BLAZIER, a citizen of the United States, residing at Newark, in the county of Essex and State of New Jersey, have invented certain new and useful Improvements in Clamps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improved clamp, and is designed to provide a holding means for the adjustable head of a clamp which allows the head to be moved in one direction, carrying its wedging means with it, but on a movement in another direction, the wedging means will lock and the adjustable head cannot be forced back. The wedging means can be manually operated to release the head when necessary. The adjustable clamp is cheaply made; requires very little work in its construction, and is positive in its action.

The invention is illustrated in the accompanying drawing, in which

Figure 1 is a view of an adjustable head shown partly in section. Fig. 2 is a similar view, showing the parts in different relative positions. Fig. 3 is a face view of the clamp with the bar on which it slides shown in section.

In the drawings the bar 10 is the usual bar of any form of clamp, and it has an adjustable head 11 which has one face 12 opposed to a fixed head or any ordinary screwhead, or other appliance arranged on the bar to coöperate with the adjustable head 11 to hold an article in a clamped position. There are numerous ways of holding the clamp, or rather its adjustable head, but the previous means are usually made up of a number of parts that require considerable machine work, thereby increasing their cost, or the multiplicity of parts makes the device unsatisfactory.

In this device the clamp 11 is provided with a recess 13, the clamp also being recessed, as at 14, to receive the bar 10 and allow the bar to slide therethrough. An opening 15, with one wall arranged at an angle, is provided in the adjustable head, and the wedge 16 has one inclined face 17 arranged to abut on the wall of the opening 15 so that when pressure is applied to the face 12 of the adjustable head 11, the head will be locked by reason of the serrated or toothed edge 18 of the wedge 16 engaging the serrations or teeth 19, which are arranged on one edge of the bar 10. It will thus be seen that a positive lock is caused when the head 11 is forced back against the wedge. When the head is operated in the other direction, one wall of the recess will engage a projection 20 on the wedge 16, and this will cause the wedge to tilt and a smooth surface 21, which is inclined to the teeth 18, is caused to engage or slide over the teeth 19, and the teeth 18 are released from engagement with the serrations or teeth 19, and in this way the wedge trails along behind the head and becomes fixed again, when the head is operated backward. The smooth face 21, of the wedge 16, is arranged at a slight angle with the teeth 18 so that either the teeth or the smooth face engage the teeth 19 of the bar 10, but they cannot engage them at the same time.

Having thus described my invention, what I claim is:—

1. The combination with the bar of a clamp, the bar having teeth on one edge, of an adjustable head sliding on the bar and having a recess therein and having an opening passing from the recess with an inclined wall, a wedge having an inclined face to engage the inclined wall of the opening in the head, a projection on the wedge in the recess of the head, the edge of the wedge adjacent to the toothed edge of the bar having teeth arranged on a portion thereof, the remainder of that edge being slightly inclined and provided with a smooth surface.

2. The combination with the bar of a clamp having teeth on one edge, of an adjustable head sliding on the bar, a wedge loosely arranged in the bar and having teeth on one edge to engage the teeth of the bar, and having a portion of the edge engaging the bar slightly inclined and provided with a smooth surface, the wedge having a projecting portion provided for its manual manipulation.

3. The combination with the toothed bar of a clamp, of an adjustable head sliding thereon, a wedge secured to the head and arranged to rock on the bar, a portion of the rocking face to engage the teeth of the bar, the remainder of that edge having a smooth surface and being slightly inclined to the toothed edge of the wedge, the head when slid in one direction tilting the wedge and causing the smooth surface thereof to slide on the teeth of the bar, and when moved in
5 the reverse direction, forcing the teeth of the wedge to engage the teeth of the bar.

In testimony, that I claim the foregoing, I have hereunto set my hand this 20th day of March, 1907.

ALFRED G. BLAZIER.

Witnesses:
 Wm. H. Camfield,
 E. A. Pell.